J. C. FORD.
MEASURING FAUCET.
APPLICATION FILED MAY 13, 1908.
949,890.
Patented Feb. 22, 1910.
2 SHEETS—SHEET 1.
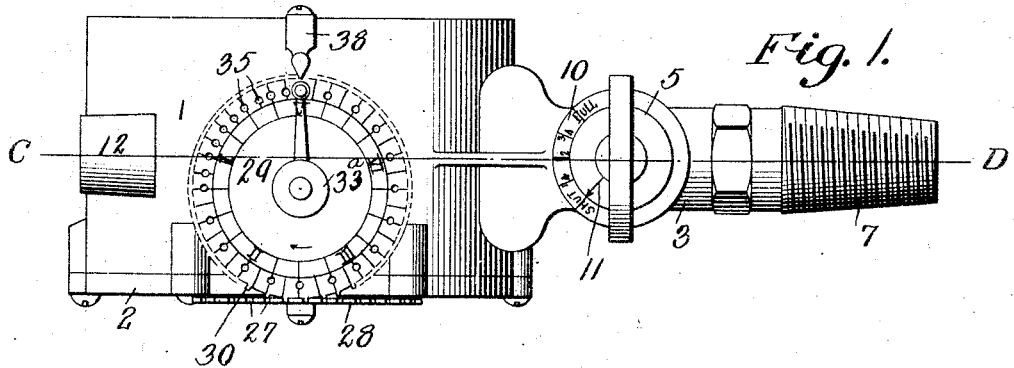
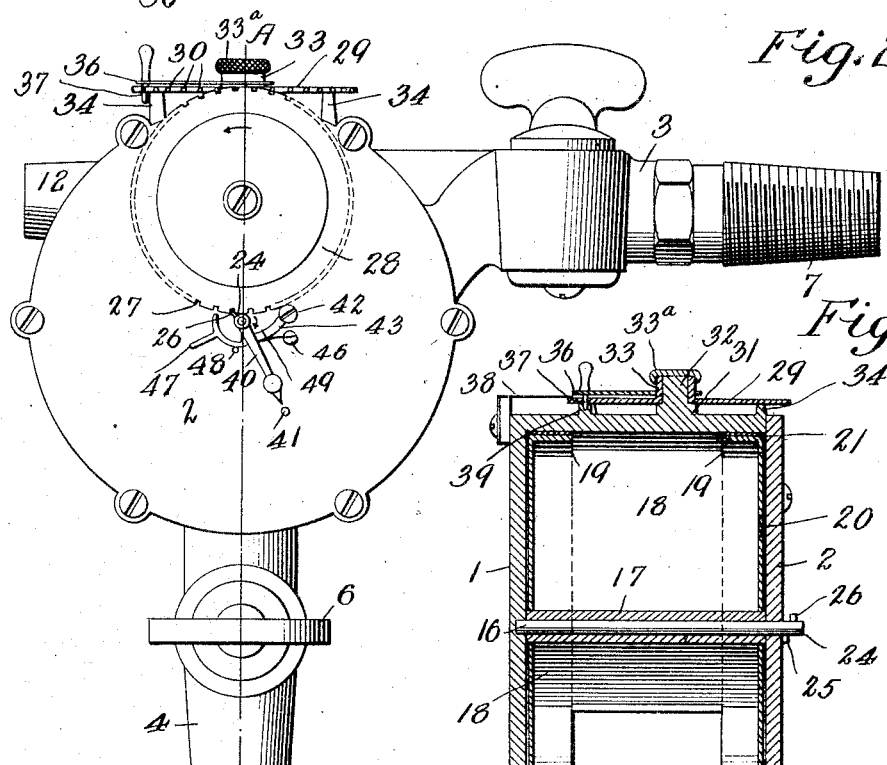
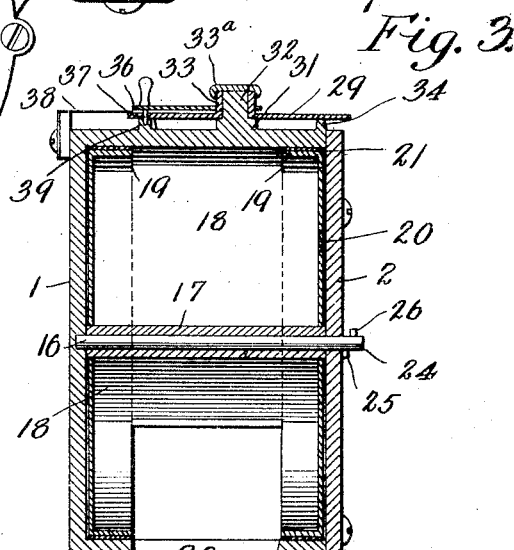
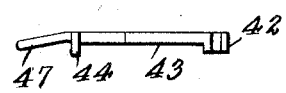
Witnesses
Jos. F. Collins
Ida J. Stanley
Inventor
John C. Ford
By Knight Bro.
Attorneys J. C. FORD.
MEASURING FAUCET.
APPLICATION FILED MAY 13, 1908.
949,890.
Patented Feb. 22, 1910.
2 SHEETS—SHEET 2.
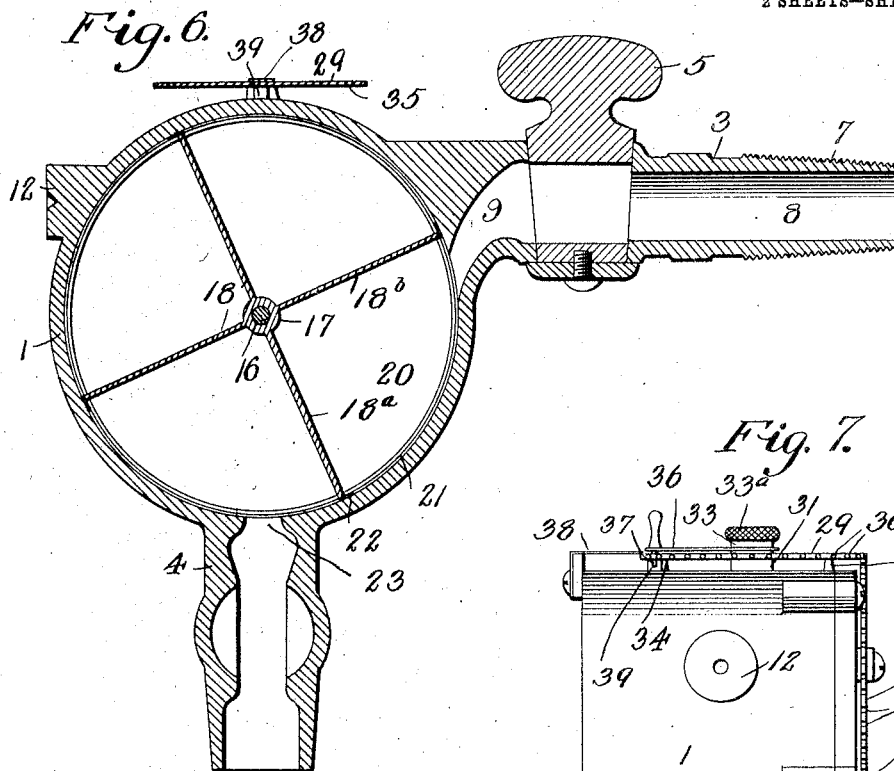
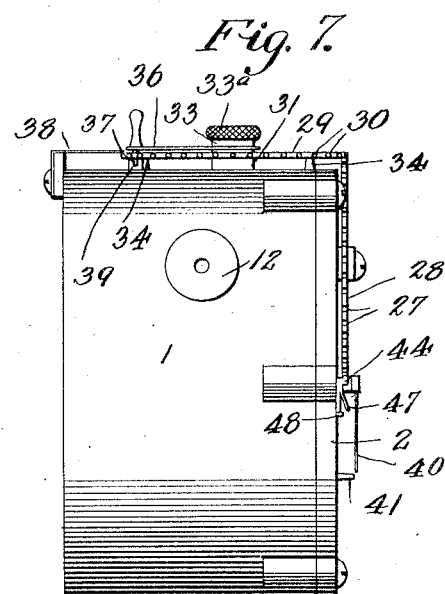
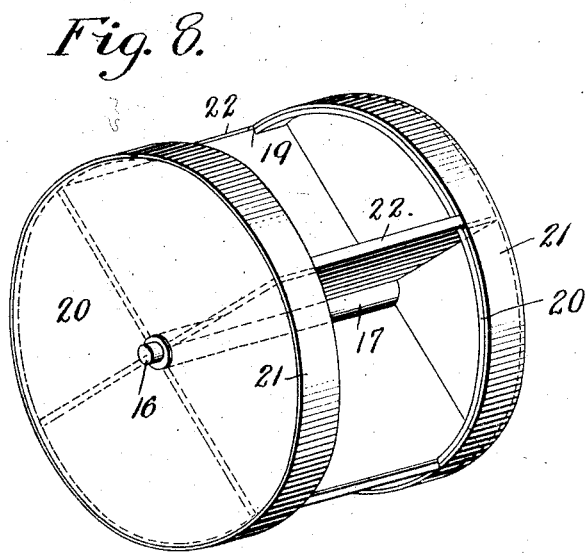
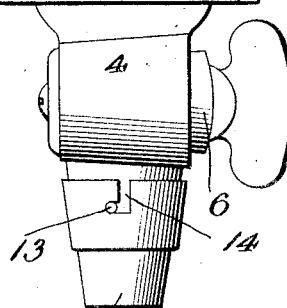
Witnesses
Jos. F. Collins
Ida J. Stanley
Inventor
John C. Ford
By
Knight Bro.
Attorneys

UNITED STATES PATENT OFFICE.

JOHN C. FORD, OF KEOKUK, IOWA, ASSIGNOR OF ONE-HALF TO JOHN DE JONG, OF KEOKUK, IOWA.

MEASURING-FAUCET.

949,890.   Specification of Letters Patent.   Patented Feb. 22, 1910.

Application filed May 13, 1908. Serial No. 432,740.

*To all whom it may concern:*

Be it known that I, JOHN C. FORD, a citizen of the United States, residing at Keokuk, in the county of Lee and State of Iowa, have invented certain new and useful Improvements in Measuring-Faucets, of which the following is a specification.

This invention relates to measuring faucets and an object of the invention is to provide a measuring faucet which, without requiring any pumping or handle-turning, is capable of accurately measuring any desired quantity of liquid.

Other and further objects of the invention will appear in the following description and will be more particularly pointed out in the appended claims.

In the accompanying drawings, Figure 1 is a top view of my improved faucet; Fig. 2 is a front view; Fig. 3 is a section on line A—B, Fig. 2, some parts of the registering mechanism being left out; Fig. 4 is a plan detail view, on an enlarged scale; Fig. 5 is front view, on an enlarged scale of the locking means and the operating means for the registering mechanism; Fig. 6 is a section on line C—D, Fig. 1; Fig. 7 is an end view of the faucet, and Fig. 8 is a perspective view of the measuring cylinder proper.

The faucet comprises a cylindrical casing which consists of a body portion 1 and a cap or cover 2 bolted to the body portion. The inlet stem 3 and the outlet stem 4 are cast in one piece with the body portion 1 and are provided with stop cocks 5 and 6 respectively. The inlet stem 3 has an outer threaded portion 7 for attaching the faucet to a tank containing the liquid to be measured. The inlet-passage 8 has a downwardly inclined portion 9 at the place of communication between the inlet passage, and the interior of the casing. The housing of the stop-cock 5 is provided with a scale 10 and the cock is provided with a pointer 11 to indicate the extent to which the stop cock is opened. The body portion 1 has a boss 12 which serves for centering the inlet-stem 3 when the threads are being cut on the portion 7. On the outlet-stem 4 is provided a pin 13 with which can engage an angular slot 14 in an outlet-funnel 15 (Fig. 7) which thus may be secured to the outlet stem 4.

The measuring cylinder proper comprises a shaft 16 which is journaled in the body portion 1 and in the cover 2. The shaft is provided with a hub 17 which has its ends abutting against the inner walls of the body portion 1 and of the cover 2, thereby preventing axial displacement of the shaft.

18 indicates four spider-arms which are secured to the hub 17. Each spider arm 18 has its outer end cut away at the sides to provide recesses 19 and on the side portions of the spider arms are fitted caps 20 which abut against the sides of the intermediate portion of the spider arms and are soldered to the arms. The cylindrical surface of each cap is lined with packing material 21 and the outer end of each spider-arm 18 has secured thereto a packing strip 22, which preferably is of greater thickness than the spider-arm.

When the measuring cylinder is fitted in the casing the end walls of the caps 20 are spaced from the inner wall of the body-portion 1 and the inner wall of the cover 2 (see Fig. 3) and the packing 21 and packing strips 22 fit snugly against the cylindrical wall of the casing. The friction between the measuring cylinder and the casing is therefore limited to the packings 21 and packing strips 22 and there is no frictional engagement between the end walls of the caps and the casing. The width of the intermediate portion of the spider-arms 18 is equal to the width of the inlet-port 9 and outlet port 23 and the caps 20 consequently do not prevent the liquid from entering or leaving the measuring cylinder.

The shaft 16 has one end 24 projecting outside of the casing and provided with pins 25 and 26. The pin 26 is adapted to engage in notches 27 provided in the periphery of a disk 28 which is rotatably mounted in the cover 2. The notched disk 28 engages with a registering dial 29 which has its periphery provided with pins 30 which engage in the notches 27. The dial 29 is rotatably mounted on a boss 31 which is provided on the top of the body portion 1, the boss being provided with an upwardly extending cylindrical projection 32 which serves as pivot-pin for the dial 29. At its center the dial 29 is provided with a hub 33 having a milled cap 33ª on its upper end. Near its periphery the dial 29 rests on posts 34 which are provided on the body portion 1 and which prevent the dial from wabbling during its rotation. The registering dial is suitably graduated and provided with holes 35 at the division lines, the numerals at the lines indicating gallons. In the drawings I have shown only one gallon provided with holes for every pint, the remainder of the gallons being provided with holes for quarts.

An arm 36 is rotatably mounted on the hub 33 of the dial 29 and is provided with a downwardly extending pin 37 near its outer end, the pin fitting the holes 35 in the dial. The arm 36 is loosely mounted on the hub so as to permit of the arm being lifted to cause the pin to be withdrawn from the corresponding hole 35, whereupon the arm may be swung on the hub 33 and the pin may be dropped into another of the holes 35. The cap 33$^a$ limits the upward movement of the arm 36 and prevents the arm from dropping off.

38 indicates an index hand secured on the casing 1 and 39 indicates a stop which is secured on the top of the casing below the dial 29 and a short distance from the point of the index hand 38.

On the projecting end 24 of the shaft 16 is secured an index hand 40 which indicates the position of the spider arms 18 in the casing. When the index hand 40 registers with a stud 41 on the cover 2 the measuring cylinder is in the right position for starting the operation.

The cover 2 is provided with a pin 42 on which is pivoted a pawl 43 which has its end 44 adapted to engage in the notches 27 in the disk 28. The end 44 of the pawl projects first outwardly from the pawl and thence upwardly toward the disk 28. A leaf spring 45, which has one end secured to the cover 2 at 46 and which has its other end abutting the pawl, tends to hold the end 44 of the pawl in engagement with the disk 28. The pawl is further provided with an outwardly bent handle 47 by means of which the pawl may be withdrawn by hand from engagement with the disk 28, the downward movement of the pawl being limited by a stop or rest 48. The pawl has a cam face 49 which, during the rotation of the shaft, is intermittently engaged by the pin 25, whereby the pawl 43 is temporarily withdrawn from the notch 27 against the action of the spring 45.

The mode of operating my improved measuring faucet is as follows:—Let it be assumed that the registering mechanism is in the position shown in Fig. 1 in which the index-hand 38 registers with the division line marked V on the dial 29 and in which the pin 37 is positioned in the hole 35 on the division line V. Let it further be assumed that it is desired to measure off three gallons of liquid. The pin 37 is then lifted out of the hole in the dial and the arm 36 is turned until the pin is directly over the hole 35 on the division line marked III on the dial and the pin 37 is then dropped into this hole. The stop cocks 5 and 6 are thereupon opened and the liquid which enters the measuring cylinder tangentially at 9 fills one of the compartments between the spider arms 18. The weight of the liquid causes the measuring cylinder to turn and when the spider arm, which for the sake of clearness is marked 18$^a$, reaches the outlet 23 the liquid commences to flow out through the outlet stem 4. Simultaneously herewith the spider arm 18$^b$ reaches the inlet port 9 and the next compartment is filled with liquid. As the liquid is generally under pressure, not only the weight of the liquid but also its impact against the spider arms causes the measuring cylinder to rotate. Each compartment of the measuring cylinder is supposed to hold one fourth of a pint and during one complete rotation of the cylinder one pint of liquid will therefore be measured off. The shaft 16 partakes of the rotation of the measuring cylinder and the pin 26, which at the start of the operation engages in one of the notches 27, (see Fig. 2) causes a partial rotation to be imparted to the disk 28. It will be understood that when the index-hand 40 registers with the stud 41,—which it is caused to do before the operation is started—the disk 28 is free to move as the end 44 of the pawl 43 is held from engagement with the disk by the pin 25. During one revolution of the cylinder the pin 26 only moves the disk 28 a distance corresponding to the distance between two adjacent notches 27 and the pin 26 then leaves the notch, and the pawl 43, which in the meantime has been released by the pin 25, snaps into one of the notches 27 and locks the disk against further rotation. Directly before the pin 26 enters the next notch 27 the pin 25 acts on the cam face 49 of the pawl and again withdraws the pawl from engagement with the disk. Through the medium of the pins 30 which engage in the notches 27 the rotation of the disk 28 is partaken of by the dial 29 and during one complete rotation of the measuring cylinder and its shaft the dial 29 will therefore be shifted circumferentially a distance corresponding to the distance between two adjacent division lines, that is the index-hand 38 will register one pint measured off. As the disk 28 and the dial 29 rotate only during about one fourth of the time it takes for the shaft 16 to complete one revolution the attendant will have ample time to watch the movement of the registering dial. For each time the measuring cylinder makes one revolution the registering dial will indicate one more pint measured off and when the numeral III of the dial finally reaches the index-hand 38 the pin 37, which is located in the hole of the division line III, will reach the stop 39 and further movement of the dial 29 and the disk 28 is thereby prevented. At the moment the pin 37 hits the stop 39 the pin 26 leaves one of the notches 27 and completes the rotation until reaching the next notch and as the disk 28 is now locked against rotation the further movement of the shaft 16 is prevented and the entire apparatus comes to a standstill. The stop cock 5 is then closed and all the parts are now in register ready for the next measuring operation. If the faucet is not to be used for some time the stop cock 6 should be closed to prevent liquid dripping on the floor. The arm 36 is used to prevent the pin 37 from being lost and also serves to guide the pin directly to the holes 35.

Having thus described my invention, what I claim as new is:—

1. In a measuring faucet, the combination of a casing, a measuring cylinder rotatably mounted in said casing, a registering dial rotatably mounted on said casing, a disk rotatably mounted on the casing and meshing with the dial, a pin effecting connection between the rotating cylinder and the disk, said connection adapted to be effected once on each rotation of the measuring cylinder, means for locking the disk against movement when said connection is not effected, means for automatically disconnecting said locking means, and means associated with the registering dial for stopping its movement, said means and the disk stopping means coöperating to lock the registering cylinder at periods determined by the dial locking means.

2. In a measuring faucet, the combination with the casing, of a measuring cylinder rotatably mounted in said casing, a rotatable shaft on which said cylinder is mounted having one end projecting outside of the casing, a registering dial for registering the amount of liquid measured off by the cylinder, a disk on the casing and engaging with the registering dial, means on the projecting end of the shaft for imparting movement to said disk during a part of a revolution of the shaft whereby to operate the register, and means for locking said dial and disk against movement during the remainder of the revolution of the shaft.

3. In a measuring faucet, the combination with the casing, of a measuring cylinder rotatably mounted in said casing, a rotatable shaft on which said cylinder is mounted having one end projecting outside of the casing, a registering mechanism for registering the amount of liquid measured off by the cylinder, means on the projecting end of the shaft for imparting movement to said mechanism during a part of a revolution of the shaft, means for locking said mechanism against movement during the remainder of the revolution of the shaft, and means on the projecting end of the shaft for withdrawing said locking means to permit movement to be imparted from the shaft to the registering mechanism.

The foregoing specification signed at Keokuk, Iowa, this 6th day of May, 1908.

JOHN C. FORD.

In presence of two witnesses—
H. T. MOORE,
PAUL LUEDTKE.